US010974190B2

(12) United States Patent
Jackson et al.

(10) Patent No.: US 10,974,190 B2
(45) Date of Patent: *Apr. 13, 2021

(54) HYDROGEN SULFIDE REMOVAL PROCESS

(71) Applicant: MERICHEM COMPANY, Houston, TX (US)

(72) Inventors: David Jackson, Fort Bend, TX (US); Jeffrey Bruce Gomach, Galveston, TX (US); Michael Hardy, Harris, TX (US)

(73) Assignee: MERICHEM COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,346

(22) Filed: Apr. 21, 2020

(65) Prior Publication Data

US 2020/0246744 A1 Aug. 6, 2020

Related U.S. Application Data

(63) Continuation of application No. 16/036,471, filed on Jul. 16, 2018, now Pat. No. 10,661,220.

(60) Provisional application No. 62/635,741, filed on Feb. 27, 2018.

(51) Int. Cl.
| | | |
|---|---|---|
| B01D 53/14 | (2006.01) |
| B01J 38/64 | (2006.01) |
| B01J 38/12 | (2006.01) |
| B01D 53/86 | (2006.01) |
| B01J 38/70 | (2006.01) |
| C01B 17/64 | (2006.01) |
| B01D 53/34 | (2006.01) |
| B01D 53/78 | (2006.01) |
| B01D 53/52 | (2006.01) |
| E21B 21/06 | (2006.01) |
| C02F 103/10 | (2006.01) |
| C02F 103/18 | (2006.01) |
| C02F 101/10 | (2006.01) |
| E21B 43/34 | (2006.01) |

(52) U.S. Cl.
CPC ..... *B01D 53/1418* (2013.01); *B01D 53/1425* (2013.01); *B01D 53/1468* (2013.01); *B01D 53/346* (2013.01); *B01D 53/52* (2013.01); *B01D 53/78* (2013.01); *B01D 53/8603* (2013.01); *B01D 53/8693* (2013.01); *B01J 38/12* (2013.01); *B01J 38/64* (2013.01); *B01J 38/70* (2013.01); *C01B 17/64* (2013.01); *E21B 21/067* (2013.01); *E21B 21/068* (2013.01); *B01D 2251/304* (2013.01); *B01D 2251/306* (2013.01); *B01D 2251/404* (2013.01); *B01D 2251/604* (2013.01); *B01D 2251/606* (2013.01); *B01D 2251/608* (2013.01); *B01D 2252/10* (2013.01); *B01D 2255/70* (2013.01); *B01D 2257/304* (2013.01); *C02F 2101/101* (2013.01); *C02F 2103/10* (2013.01); *C02F 2103/18* (2013.01); *E21B 43/34* (2013.01)

(58) Field of Classification Search
CPC ......... C01B 17/64; C01B 17/43; C01B 17/20; C01B 17/22; C01B 1/20; B01D 53/14; B01D 53/1425; B01D 53/1468; B01D 53/52; B01D 53/8612; B01D 2257/304; E21B 21/068
See application file for complete search history.

(56) References Cited

U.S. PATENT DOCUMENTS

| | | | |
|---|---|---|---|
| 2,868,617 A * | 1/1959 | Mills | B01D 53/523 423/226 |
| 2,897,140 A | 7/1959 | Gislon et al. | |
| 2,975,026 A | 3/1961 | Mills | |
| 3,098,033 A | 7/1963 | Weisang et al. | |
| 3,104,951 A | 9/1963 | Urban | |
| 3,890,428 A | 6/1975 | Jayawant | |
| 4,367,212 A | 1/1983 | Castrantas | |
| 4,992,078 A | 2/1991 | Meszaros | |
| 10,661,220 B2 * | 5/2020 | Jackson | B01D 53/1468 |
| 2003/0072707 A1 | 4/2003 | Ray et al. | |
| 2017/0073257 A1 | 3/2017 | Archer, III | |
| 2018/0297845 A1 | 10/2018 | Mengel et al. | |
| 2019/0047886 A1 | 2/2019 | Archer, III | |

(Continued)

FOREIGN PATENT DOCUMENTS

WO 2017/048544 A1 3/2017

OTHER PUBLICATIONS

International Search Report and Written Opinion for Int. App. No. PCT/US2019/032793, dated Aug. 22, 2019.

*Primary Examiner* — Timothy C Vanoy
(74) *Attorney, Agent, or Firm* — McDonnell Boehnen Hulbert & Berghoff LLP

(57) ABSTRACT

A process is presented where a feed stream containing a hydrogen sulfide and another feed component is introduced into an absorber that the feed stream flows upward from the bottom of the absorber and contacts a liquid treatment solution, where the liquid treatment solution contains a sulfur dye catalyst. The hydrogen sulfide is absorbed into the liquid treatment solution and converted into sulfide ions. The other feed component is removed from the absorber vessel substantially free of the hydrogen sulfide and a spent treatment solution is also removed from the absorber vessel and fed to an oxidation vessel where it is contacted with an oxygen containing gas causing the sulfide ions to oxidize to thiosulfate and converting the spent sulfur dye catalyst to regenerated sulfur dye catalyst. The thiosulfate is recovered, and the regenerated sulfur dye catalyst can be recycled as part of the liquid treatment solution.

19 Claims, 4 Drawing Sheets

(56) References Cited

U.S. PATENT DOCUMENTS

2019/0248684 A1    8/2019   Archer, III
2019/0300402 A1   10/2019   Archer, III
2020/0140298 A1*   5/2020   Archer, III ............. B01D 53/96

* cited by examiner

HYDROGEN SULFIDE REMOVAL PROCESS

CROSS REFERENCE TO RELATED APPLICATIONS

The present application is a continuation of U.S. patent application Ser. No. 16/036,471, filed Jul. 16, 2018, which claims priority to U.S. Provisional Patent Application No. 62/635,741 filed Feb. 27, 2018. The entire disclosure contents of these applications are herewith incorporated by reference into the present application.

TECHNICAL FIELD

The present disclosure is directed to a method and apparatus for continuously removing hydrogen sulfide gas ($H_2S$) from a fluid stream and the subsequent selective production of a thiosulfate product. The method includes absorption of the $H_2S$ in an aqueous treatment solution followed by an oxidation reaction to produce thiosulfate using a catalyst containing vat dyes. The spent catalyst is regenerated in an oxidizer using an oxygen-containing gas and is recycled for use as part of the aqueous treatment solution.

BACKGROUND

The removal of sulfur contaminants, specifically $H_2S$, from wastewater streams using aqueous salt streams is known. Likewise, the removal of $H_2S$ from hydrocarbon containing gas streams is known. However, such known processes for treating gas streams do not directly produce useful chemicals. Accordingly, there is a need to develop economical processes that can selectively scrub and remove $H_2S$ from industrial gas streams at ambient temperatures and at the same time produce a useful liquid product. These and other advantages will become evident from the following more detailed description of the present disclosure.

SUMMARY

This disclosure relates to a process for treating a feed stream containing an industrial gas or liquid stream contaminated with $H_2S$ to obtain a scrubbed $H_2S$-free fluid stream and a separate liquid aqueous stream containing thiosulfates. In its broadest application the present disclosure accepts a feed stream that is first contacted in an absorber with an aqueous treatment solution preferably maintained at a pH of greater than 7. The treatment solution contains a catalyst as described in detail below and can contain anions of alkali or ammonia salts and cations of hydroxide, sulfide or carbonate, such as, potassium carbonate, potassium hydroxide, calcium carbonate, sodium hydroxide, sodium carbonate, ammonia, and potash. Additionally, solutions of ammonia or alkali metal salts of weak acids such as carbonic, boric, phosphoric and carbolic acids, or aqueous solutions or organic bases such as ethanolamines can be used, as well as, aqueous solutions of alkali metal salts of amino-carboxylic acids such as glycine or alanine.

The salt concentration in the treatment solution is preferably between 0 wt. % and a quantity sufficient to saturate the solution. The feed stream and treatment solution preferably contact each other in a countercurrent flow scheme. The absorber may contain physical components to assist in the contacting of the feed and treatment solution, such as, baffling, packing, trays, static mixers, valves, fiber film type materials, or other materials that increase the contact area between the feed stream and the treatment solution. The amount of treatment solution used is based on the concentration of $H_2S$ in feed, as well as the feed rate. Here, sulfide ions are formed upon $H_2S$ absorption in the treatment solution which are then adsorbed on the catalyst for the further reaction. Later, the sulfide ions are oxidized in the separate oxidizer to form thiosulfate. The produced thiosulfate remains in the treatment solution. When potassium salts are present in the treatment solution, potassium thiosulfate is selectively formed. A substantially $H_2S$-free product stream is removed from the absorber for further processing or transportation.

The catalyst used to oxidize the sulfide ions to thiosulfate in the oxidizer is preferably in the form of vat dyes or metal sulfates and more preferably in the form of sulfur dyes and/or sulfurized vat dyes. Sulfurized vat dyes are chemically and structurally similar to sulfur dyes including having the disulfide/thiolate functionality. They are given the vat dye designation because they are typically obtained using a vat dye process. Sulfur dyes and sulfurized vat dyes which may be utilized in accordance with the method of the invention include but are not limited to the following ("C.I." stands for "Color Index"):

C.I. Sulfur Yellow 1, 2, 3, 4, 5, 6, 8, 9, 10, 11, 12, 13, 14, 16, 20 and 23, C.I. Leuco Sulfur Yellow 2, 4, 7, 9, 12, 15, 17, 18, 21, 22 and 23 and C.I. Solubilized Sulfur Yellow 2, 4, 5, 19, 20 and 23;

C.I. Sulfur Orange 1, 2, 3, 4, 5, 6, 7 and 8, C.I. Leuco Sulfur Orange 1, 3, 5 and 9 and C.I. Solubilized Sulfur Orange 1, 3, 5, 6, 7 and 8;

C.I. Sulfur Red 1, 2, 3, 4, 5, 6, 7, 8, 9, 10, 12 and 13, C.I. Leuco Sulfur Red 1, 4, 5, 6, 11 and 14 and C.I. Solubilized Sulfur Red 3, 6, 7, 11 and 13;

C.I. Sulfur Violet 1, 2, 3, 4 and 5, C.I. Leuco Sulfur Violet 1 and 3 and C.I. Solubilized Sulfur Violet 1;

C.I. Sulfur Blue 1, 2, 3, 4, 5, 6, 7, 8, 9, 10, 11, 12, 13, 14, 15, 16, 17, 18 and 19, C.I. Leuco Sulfur Blue 1, 2, 3, 5, 7, 8, 9, 11, 13, 15 and 20 and C.I. Solubilized Sulfur Blue 1, 2, 4, 5, 6, 7, 10, 11, 13, and 15;

C.I. Sulfur Green 1, 2, 3, 4, 5, 6, 7, 8:1, 9, 10, 11, 12, 13, 14, 15, 16, 17, 18, 19, 20, 21, 22, 23, 24, 25, 26, 27, 28, 29, 31, 32 and 33, C.I. Leuco Sulfur Green 1, 2, 3, 4, 7, 11, 16 30, 34, 35, 36, and 37 and C.I. Solubilized Sulfur Green 1, 2, 3, 6, 7, 9, 19, 26, and 27;

C.I. Sulfur Brown 1, 2, 3, 4, 5, 6, 7, 8, 9, 10, 11, 12, 13, 14, 14:1, 15, 15:1, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53:1, 54, 55, 56, 57, 58, 59, 60, 61, 62, 63, 64, 65, 66, 67, 68, 69, 70, 71, 72, 73, 74, 76, 77, 78, 79, 84, 85, 87, 88, 89, 90, 91, 93, and 94;

C.I. Leuco Sulfur Brown 1, 3, 4, 5, 8, 10, 11, 12, 14, 15, 21, 23, 26, 31, 37, 43, 44, 81, 82, 86, 87, 90, 91, 92, 93, 94, 95 and 96 and C.I. Solubilized Sulfur Brown 1, 4, 5, 8, 10, 11, 12, 14, 15, 16, 21, 26, 28, 31, 51, 52, 56, 60, 75, 80, and 83;

C.I. Sulfur Black 1, 2, 3, 4, 5, 6, 7, 8, 9, 10, 11, 12, 13, 14, 15, 16 and 17;

C.I. Leuco Sulfur Black 1, 2, 6, 9, 10, 11, and 18;

C.I. Solubilized Sulfur Black 1, 2, 5, 7, and 11; and,

C.I. Vat Yellow 21, C.I. Vat Orange 21, C. I Vat Green 7, C.I. Vat Blue 7, 42, 43, Vat Black 11.

A more complete listing of the sulfur dyes and sulfurized vat dyes mentioned herein above may be found in the Color Index, $3^{rd}$. Ed., issued by the Society of Dyers and Colorists (London, GB), as well as in the supplementary volumes published there to and in the Color Index International, $4^{th}$ Edition Online which are hereby incorporated by reference.

Other, though less preferable catalysts for the conversion of sulfide to thiosulfate which may be used include: sulfate lignin, copper salts of sulfate and chloride, iron salts of hydroxide, chloride, sulfide, or sulfate, phthalocyanines of copper and cobalt, manganese salts of sulfate or chloride, polyvalent phenols such as pyrocatechol or pyrogallol, and quinones such as tetra-t-butyl stilbene quinone.

The reaction of the sulfide ions with the catalyst in the absorber causes the catalyst to undergo a reduction process. In order to maximize the economic benefit of the process, it is desirable to reuse the catalyst. This can be achieved by regenerating the spent catalyst to its active form, i.e., the catalyst must be oxidized. This is accomplished in a oxidation step in the presence of an oxygen-containing gas as described more fully below.

The treatment solution containing the spent catalyst and the thiosulfate is preferably removed from the absorber (or first oxidation step) and introduced into an oxidizer vessel (the second oxidations step) where the spent catalyst is oxidized to its catalytically active form. An oxygen containing gas, for example, air, is preferably introduced into the oxidizer in the form of a sparged gas stream, but can also be introduced by any type of gas/liquid contact device such as across mixers, valves, packing, or membranes. The oxygen reacts with sulfides bound to the catalyst to form thiosulfate and regenerated catalyst in oxidized state.

A residence time in the oxidizer vessel of at least 5 minutes is usually sufficient to fully oxidize the spent catalyst. Excess oxygen-containing gas that is not consumed in the oxidation reaction is removed as an off-gas stream from the top of the oxidizer. Once the oxidation step is complete, the regenerated treatment solution containing the thiosulfates are removed from the oxidizer and can be recycled back to the absorber for contacting with the incoming feed stream containing $H_2S$, thus completing a continuous processing operation. Fresh treatment solution can be added to this recycled regenerated treatment solution as make-up stream. Optionally, a portion of the regenerated treatment solution can be removed to prevent a buildup of thiosulfate in the treatment solution. This removed portion of the regenerated treatment solution is then further processed as described in more detail below to remove the regenerated catalyst for recycle and to produce a thiosulfate product stream that is a useful product in a variety of industrial and agricultural manufacturing processes, for example the production of fertilizer.

The operating parameters of the above-described absorber/oxidation processes include temperatures in the range of from about 15° C. to about 100° C., preferably in the range from about 40-70° C. The pressure of the vessels can range from atmosphere to 150 barg, preferably from about 0.5-30 barg. Reaction times can range from about 5-240 mins, preferably less than 30 min. The process can be run as a batch or continuous operation.

The present disclosure also provides a treatment process where "produced water" can be processed to supply useful on-site chemicals useful in the scrubbing and removal of $H_2S$ from fluid feed streams. Produced water is a term used in the oil industry to describe water that is produced or collected as a byproduct along with oil and gas recovered from wells. Oil and gas reservoirs often have significant quantities of water, as well as hydrocarbons, sometimes in a zone that lies under the hydrocarbons, and sometimes in the same zone with the oil and gas. Oil wells sometimes produce large volumes of water with the oil, while gas wells tend to produce water in smaller proportion. To achieve maximum oil recovery, it is sometimes necessary to employ water-flooding, in which water is injected into the reservoirs to help force the oil to the production wells. The injected water eventually reaches the production wells, and so in the later stages of waterflooding, the produced water proportion of the total production increases. The water composition ranges widely from well to well and even over the life of the same well. Much of the produced water is recovered having varied high concentration of salts (i.e., hardness) and having high amounts of total dissolved solids, thus rendering the produced water unacceptable for beneficial reuse. All produced water also contains oil and suspended solids. Some produced water contains metals such as zinc, lead, manganese, iron and barium.

Historically, produced water was disposed of in large evaporation ponds. However, this has become an increasingly unacceptable disposal method from both environmental and social perspectives. As such, produced water is commonly considered an industrial waste.

The water hardness in the form of dissolved ions, especially alkali carbonates, contained in produced water can be reused by the presently disclosed process to capture the hydrogen sulfide contaminate in the natural gas and oil thereby reducing the demand for oilfield chemicals. In one embodiment of the presently disclosed process, produced water can be first subjected to a traditional 3-phase separator, where gas, hydrocarbon and aqueous phases are separated from each other. Alternatively, the produced water could be mixed with a portion of regenerated liquid treatment solution and then separated in a 3-phase separator. The aqueous phase is then directed to the above-described oxidizer vessel where it contacts the sparged oxygen-containing gas, spent treatment solution and newly oxidized (regenerated) treatment solution. Since the aqueous phase usually contains some amount of sulfides, typically in the range from about 2 ppm to about 1,200 ppm, as a result dissolved $H_2S$, the oxygen in the sparged gas combined with the newly regenerated catalyst causes oxidation of these aqueous phase sulfides and converts them to thiosulfate. These produced thiosulfates from the aqueous phase remain in the treatment solution as the treatment solution continues to undergo regeneration in the oxidizer.

The removed regenerated treatment solution that now contains the treated aqueous phase recovered from the produced water has an Oxidation Reduction Potential (ORP) greater than that of the ORP of both the original separated aqueous phase and the spent treatment solution.

ORP, also referred to as reduction potential, oxidation/reduction potential or redox potential is a measure of the tendency of a chemical species to acquire electrons and, as such, be reduced. Typically, ORP is measured in volts (V), or millivolts (mV). Each species has its own intrinsic reduction potential; the more positive the potential, the greater the species' affinity for electrons and tendency to be reduced. ORP is a commonly used as a measurement for water quality. In aqueous solutions, reduction potential is a measure of the tendency of the solution to either gain or lose electrons when it is subject to change by introduction of a new species. A solution with a higher (more positive) reduction potential than the new species will have a tendency to gain electrons from the new species (i.e. to be reduced by oxidizing the new species) and a solution with a lower (more negative) reduction potential will have a tendency to lose electrons to the new species (i.e. to be oxidized by reducing the new species). Because the absolute potentials are difficult to accurately measure, reduction potentials are defined relative to a reference electrode. Reduction potentials of aqueous solutions are determined by measuring the potential difference between an inert sensing electrode in contact with the solution and a stable reference electrode connected to the solution by a salt bridge. In the present disclosure, a measurement of the ORP of the solution in the absorber and/or in the oxidizer can be used to control the flow or amount of oxygen containing gas that is introduced into the oxidizer.

The treated aqueous phase and regenerated treatment solution referred to as a recycle treatment stream is then sent to the absorber where it is contacted with the feed stream containing oil, gas, or both. The recycled treatment stream is contacted with the oil/gas to the extract the hydrogen sulfide contaminants from the oil/gas forming sulfides that are then oxidized to form thiosufates. The resultant treatment solution that now contains spent catalyst is sent to the oxidizer vessel where the spent catalyst is oxidized to its active form and making it available for the oxidation of any residual sulfides, including sulfides entering the oxidizer vessel in the aqueous stream separated from the produced water.

The regenerated treatment solution containing the treated aqueous phase can now be removed from the oxidizer vessel when the ORP of the regenerated solution is greater than −0.4 mV. This removed regenerated treatment solution can then be filtered to remove the regenerated catalyst, yielding a stream of water with thiosulfate ions ranging in concentration from about 0 wt. % to about saturation. The saturation concentration depends on type of cation, e.g. ~51 wt. % for potassium. The filter media that recovers and holds the removed catalyst can be periodically backflushed with a flush solution, preferably a flush solution containing dissolved sulfides. Performing the back flushing operation on the filter media allows the regenerated catalyst to be removed and reused in the process, thus minimizing catalyst loss and reducing the amount of fresh (make-up) treatment solution. By using a flushing solution containing sulfides the solubility of the filtered regenerated catalyst is enhanced and improves the efficiency of cleaning the filter.

Regarding the aqueous phase that can be fed to the oxidizer, it may be necessary, depending on the source of the produced water, to increase the measured hardness by adding to the produced water and/or separated aqueous phase lime, potash, other sources of alkali hydroxide or carbonate, and mixtures thereof. Once the catalyst is filtered, it is now possible to send all or a portion of this filtered regenerated treatment solution to disposal via well injection in a manner similar to current practice of injecting recovered produced water. In the above described embodiment, the treatment of the gas or oil and then subsequent disposal of the aqueous phase directly on-site or close to the oil/gas wells provides a method that greatly reduces the costs of procuring chemicals and instead uses chemicals that are readily available in the produced water.

Likewise, using the produced water obtained on-site allows the treatment solution to be prepared on-site from concentrates and avoids the need to transport large quantities water normally used to prepare the treatment solution. In conventional processes for the removal of hydrogen sulfide, transportation cost related to shipping large volumes of treatment solutions to the process site are significant. For instance triazine based chemicals require >1 gal per lb of sulfur removed. By utilizing produced water as described above, chemicals already available in the produced water can be used and do not have to be shipped to the site resulting in significant operational cost savings. Further, the present disclosure requires only a small addition of catalyst, resulting in a significant savings in logistics. Additionally, prior known sulfur treating units such as amine/claus systems or iron-redox require significantly more capital due to their corrosive nature. The low temperature and pressure of the oxidizer in presently disclosed system provides for significant ease of operation, reduced operating cost, and lower capital expense.

The processes of the present disclosure are suitable for the treatment of hydrogen sulfide from various sources including natural gas, condensate, landfill gas, and other acid gases. As indicated, preferably, they are useful to employ a sulfur dye catalyst to oxidize the absorbed hydrogen sulfide into a thiosulfate ion in the absorber vessel. It is economically desirable to recover the catalyst for reuse from the partially or fully spent solution. One possible method for the recovery of the catalyst requires the use of an appropriate filtration unit operation, where membranes or filter media, such as granular activated carbon, are used to trap and recover the catalyst from a liquid stream. Because oxidation of the spent catalyst in the oxidizer vessel results in the formation of a catalyst slurry, the catalyst is particularly suitable for separation from the liquid solution of thiosulfate ions produced from the oxidation of sulfides that occurred in the oxidizer vessel. Because the presently disclosed process handles high volume of sulfides, the near complete oxidation of sulfide ions to thiosulfate is preferred for effective filtration. In particular, the complete oxidation of the catalyst is preferred, i.e. ORP greater than −0.4 mV for sufficient separation of the oxidized (i.e. regenerated catalyst) from potassium thiosulfate solution via filtration. As mentioned, it is also advisable to perform back flushing of the filter media with a solution containing a small amount of sulfide or other reducing medium which solubilizes the catalyst and removes it from the filter media such that it can then be introduced back into the process. This filtration/recovery method can also be used to recover sulfur dye catalysts from other industrial waste streams and to then utilize the recovered catalyst as a reagent in the process of treating hydrogen sulfide contaminated streams.

In one embodiment, sulfur dye catalyst could be recovered from an aqueous solution by adsorption on a solid media, for example, Calgon Filtrasorb 200 carbon. When the carbon absorption media containing the sulfur dye catalyst is subsequently contacted with a solution containing 2000 ppm (as sulfur) sodium sulfide, the catalyst will reduce to its soluble form and will be released from the carbon adsorption media. The soluble catalyst can then be used with the regenerated catalyst to oxidize sulfides in a feed stream to produce thiosulfate. Subsequent addition of an oxygen containing gas stream will oxidize the catalyst back to its insoluble form (i.e., a slurry or semi-solid).

Other filter media can be used, for example, membranes like Tri-sep Flat XN45 polypiperiazine amide (PPA) nanofiltration membrane having a membrane cut-off of 500 Da and being compatible in 2-11 pH.

In yet another embodiment of the present disclosure, a portion of the regenerated treatment solution can be removed from the oxidizer to not only prevent a build-up of thiosulfate within the process, but also to recover the thiosulfates as useful and economically valuable byproduct. Such a removed liquid stream would preferably be filtered as described above to recover the catalyst present in the regenerated treatment solution. Once the catalyst is removed, an aqueous solution containing thiosulfate anions and salts is obtained. This thiosulfate solution can then be fed to an ion exchange resin system. The resin can be either anion or cation exchange, for example, acrylic or methacrylic with various crosslink monomer, sulfonated copolymer resins of styrene and divinyl benzene, quaternized amine resins, and dimethylethanol amine copolymer resin, to name a few. The thiosulfate ions can be exchanged to improve the strength (concentration) of the solution or swap cations. For instance, a cation exchange resin can be pre-loaded with sodium cations through treatment of the resin with a solution of sodium chloride. A thiosulfate solution obtained from the catalyst filtration step containing ammonium thiosulfate could then be contacted with the pre-loaded sodium cation resin. The ammonia (ammonium cation) will be swapped for sodium to produce a liquid stream of sodium thiosulfate. Once all the sodium is swapped from the ion exchange resin, the ammonia saturated resin can then be regenerated exposing the resin to a sodium chloride solution to displace the ammonia such that the swap of the stored ammonia from the resin will yield an ammonium chloride solution while regenerating the resin with sodium ions for reuse.

Potassium thiosulfate can also be made by exchanging the ammonium cation in an ammonium thiosulfate solution for potassium ions in a regenerable, potassium-loaded ion exchange resin under ion exchange conditions. The resulting potassium thiosulfate product can be packaged as a liquid fertilizer product either with or without an intermediate concentration step. The ammonium-laden resin is regenerated to its potassium form by contact with a solution of potassium chloride under suitable ion exchange conditions. The ammonium chloride solution produced by the regeneration step can be also used as a lower grade liquid fertilizer. Thus, this embodiment makes two fertilizers of different grades for valuable production on each phase of the ion exchange process cycle.

Preferably, the ion exchange to make potassium thiosulfate is performed at a temperature within the range from about 10° C. to about 35° C., and most preferably at an ambient temperature within a range from about 15° C. to about 30° C. The ion exchange temperature ranges for regenerating the resin and forming ammonium chloride are generally the same as those used for the ion exchange. In a particularly preferred embodiment, the resin is charged with 20 wt. % potassium chloride at ambient temperature. Generally, the total content of $K^+$ charged to the system should be 1.25 times higher than the total capacity of the resin.

One possible processing scheme of the present disclosure is to treat a feed that contains hydrogen sulfide in an absorber vessel such that the feed stream flows upward from the bottom of the absorber and contact a liquid treatment solution flowing upward in the absorber such the liquid treatment solution mixes with the feed. The liquid treatment solution contains a sulfur dye catalyst. The residence time of contact between the liquid treatment solution and feed stream within the absorber is controlled such that the hydrogen sulfide is absorbed into the liquid treatment solution and converted into sulfide ions. A spent treatment solution containing the sulfide ions, spent sulfur dye catalyst, and dissolved gas is removed from the absorber vessel and is introduced into an oxidation vessel, where an oxygen containing gas is fed. The oxygen contacts the spent treatment solution causing the sulfide ions to oxidize to thiosulfate and to convert the spent sulfur dye catalyst to regenerated sulfur dye catalyst. The amount of oxygen fed to the oxidizer is controlled based on measured ORP in the absorber or oxidizer or both.

Any excess oxygen containing gas from the oxidation vessel is removed. A liquid stream of regenerated liquid treatment solution comprising the thiosulfate and the regenerated sulfur dye catalyst is also removed from the oxidizer separately. The regenerated liquid treatment solution can be recycled back to be mixed with the liquid treatment solution being fed to the absorber. The amount of liquid treatment solution fed to the absorber can be controlled based on measured ORP in the absorber, oxidizer or both. The thiosulfate concentration is maintained at a predetermined amount in the regenerated liquid treatment solution by removing a portion of the regenerated liquid treatment solution from the process.

In a possible variant of the above described process, the spent treatment solution is first introduced into a flash drum where a reduction in pressure causes the dissolved gas to separate from the spent treatment solution forming a flashed gas. The degassed spent treatment solution is then introduced into an oxidation vessel and the flashed gas removed from the flash drum can be introduced into a second absorber vessel and contacted with a second liquid treatment solution to convert any residual hydrogen sulfide present.

In yet another possible processing scheme, produced water is removed and recovered from an oil and gas well and then subjected to a separation process, preferably a 3-phase separation process, where an aqueous phase is obtained from the produced water. The aqueous phase is then fed to the oxidizer vessel.

Still another variant of the present disclosure includes dividing the liquid stream of regenerated liquid treatment solution comprising the thiosulfate and the regenerated sulfur dye catalyst into a first and a second portion, where the second portion of regenerated liquid treatment solution is recycled to the absorber. The first portion is fed into a separate separation process where the regenerated sulfur dye catalyst is separated from the thiosulfate by a filtration step and is recirculated to the absorber vessel. The filtration step uses a filter media that collects the regenerated sulfur dye catalyst and produces a thiosulfate solution that can be introduced into an ion exchange column where a thiosulfate product stream is produced.

It is also may be desirable to include in the separation process a back flushing step that removes the regenerated sulfur dye catalyst from the filter media so that it can be recovered and reused. One possible back flushing step comprises contacting the filter media with a liquid solution containing sulfide ions.

These and other objects will become more apparent from the detailed description of the preferred embodiment contained below.

BRIEF DESCRIPTION OF THE FIGURES

In the following detailed description of the present disclosure, reference will be made to the accompanying drawings, of which, FIG. 1 schematically illustrates one possible embodiment of the present disclosure.

DETAILED DESCRIPTION

Figure 1:
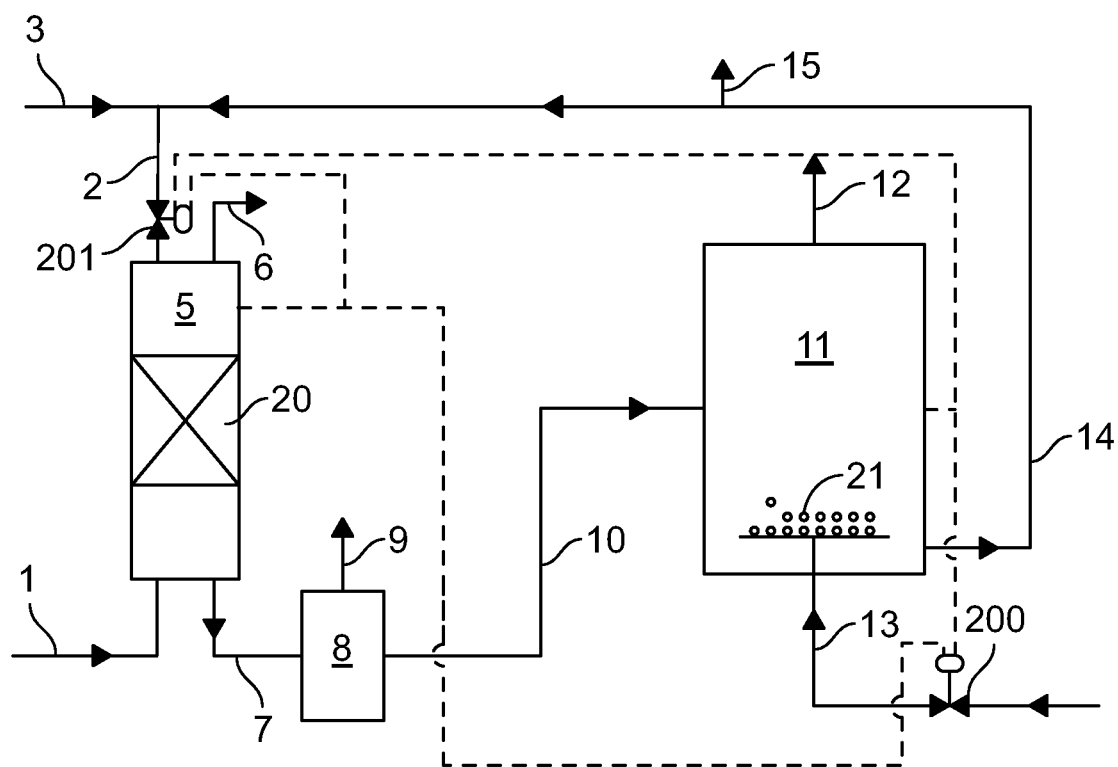

The following description based on FIG. 1 presents just one possible processing method to achieve the goals of the present invention, namely the removal of $H_2S$ from an industrial fluid stream and the production of a useful thiosulfate product.

FIG. 1 illustrates a continuous process using an absorber vessel 5 and an oxidization reactor 11 operating in series flow. A feed stream 1, for example, a feed composed of natural gas containing about 100 ppm $H_2S$ is fed at 30 barg pressure to the bottom of absorber 5 and directed in an up-flow manner for countercurrent contact with a liquid treatment solution 2 introduced at the top of absorber 5. Alternatively, the feed may contain no hydrocarbon component, for example, the feed could contain hydrogen sulfide and a non-hydrogen gas. Such a non-hydrogen gas could be air recovered from an amine system or $CO_2$ recovered from a sour water stripping process.

The absorber may contain a solid media or may be a type of bubble column. Other feed streams containing hydrogen sulfide can be processed, including those containing sour gas (at 0-100%), refined products (at 0-20 ppm), fuel gas (at 0-5%), synthesis gas (at 0-5 vol. %), acid gas (at 0-100 vol. %), natural gas (0-2 vol. %), landfill gas (0-1 vol. %), sour air, stripper overhead, crude oil, hydrocarbons, sour flash gases, and well treating fluids.

The liquid treatment solution could be composed of a mixture of fresh treatment solution 3 with regenerated treatment solution as described below. The liquid treatment solution, for example, could contain a sulfur dye catalyst and potassium carbonate and, in the case where regenerated treatment solution is mixed with the fresh treatment solution, an amount of potassium thiosulfate. Further, the liquid treatment solution could contain cations selected from the group consisting of ammonia, lithium, calcium, magnesium, potassium, and sodium. Likewise, the liquid treatment solution can contain anions, including hydroxide and carbonate. These cations and anions can be found in produced water, evaporator blowdown, process water, cooling water blowdown, or any aqueous stream containing the anions/cations in any concentration between 0 wt. % and the solubility limit of the ions.

As mentioned a solid media 20 may be used to increase the contact surface area between the downward flowing treatment solution and the up flowing gas stream. The ratio of the liquid treatment solution to the gas feed is dependent on the quantity of $H_2S$ in the gas feed 1, but contains a molar ratio of catalyst greater than 1 as compared to the moles of $H_2S$ in the feed. The $H_2S$ present in the gas stream 1 is absorbed into the treatment solution 2 as sulfide ions. The sulfur dye in its oxidized form reacts with the sulfide ions to form the dye's reduced state. A substantially $H_2S$-fee gas stream 6 is removed from the top of the oxidizer and sent for storage, transportation, released to the atmosphere, or further processing.

Figure 2:
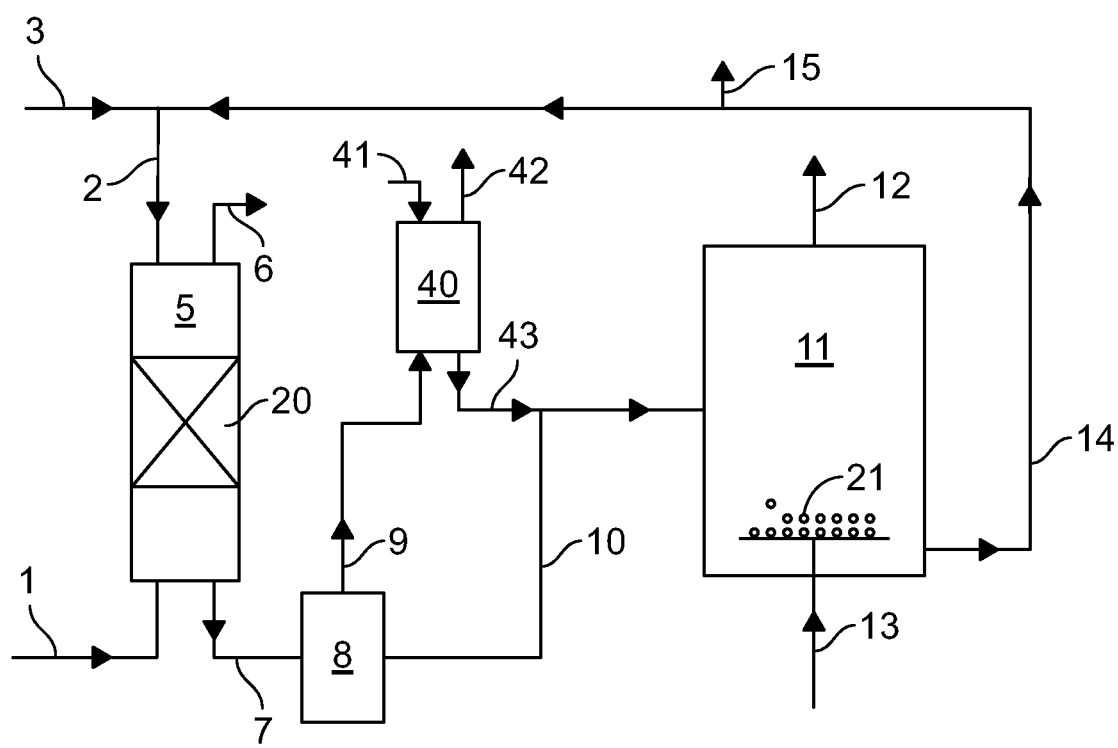
FIG. 2 schematically represents a variation of the process flow scheme depicted in FIG. 1.

A spent treatment stream 7 containing spent catalyst and potassium thiosulfate is removed from the absorber 5 and introduced into flash drum 8 where the pressure is reduced to less than 5 barg to remove soluble gases, such as $CO_2$ and $H_2O$, via stream 9. Any unconverted $H_2S$, if present, would also be removed in stream 9. Where unconverted $H_2S$ is found in the gases removed from flash drum 8, the off-gas stream 9 could be introduced into a second smaller absorber 40 to absorb and convert any remaining $H_2S$ (see FIG. 2). This smaller absorber 40 could also be a counter-current contractor with a solid media support where fresh and/or regenerated liquid treatment solution is introduced through line 41 and scrubbed $H_2S$-free gas is removed from absorber 40 via line 42. Spent treatment solution 43 is removed from the small absorber 40 and introduced into the oxidizer 11, preferably by mixing with liquid stream 10 that is removed from the flash drum 8 such that both liquid streams are fed to oxidizer 11 as shown in FIG. 2.

An oxygen-containing gas 13, such as air, is introduced into the oxidizer 11, preferably through a sparger 21. The amount of oxygen added to the oxidizer is controlled by monitoring oxidation reduction potential (ORP) values. For example, one method would include using a sensor located in the absorber and/or in the oxidizer to measure the ORP values of the solution(s). The measured ORP could be monitored by control valve 200 which then adjusts the amount of oxygen containing gas supplied to the oxidizer 11 through line 13. Alternatively, the ORP value of the regenerated liquid treatment solution exiting the oxidizer in line 14 could be measured, monitored and used to control the flow or amount of oxygen containing gas that is introduced into the oxidizer. Likewise, or in addition to, another method could include using the measured ORP values obtained from sensors in the absorber and/or in the oxidizer to operate control valve 201 which then adjusts the amount of liquid treatment solution that is fed to the absorber 5 through line 2.

Alternatively, or in addition, the concentration of $H_2S$ in the product gas stream 6 can be monitored and measured to control the amount of oxygen that is added to the oxidizer. Excess oxygen-containing gas is removed from the top of the oxidizer 11 through line 12. As mentioned, the spent catalyst fed from absorber 5 is regenerated by an oxidation reaction in oxidizer 11. Oxidation of the catalyst causes the catalyst to convert from a soluble form to an insoluble form (i.e., forming a slurry), which as described below can be recycled back to the absorber. The catalyst-sulfide complex formed in the absorber 5, is also oxidized to thiosulfate and return to the aqueous solution. A regenerated liquid stream of treatment solution containing the regenerated catalyst and thiosulfates is removed from the oxidizer via stream 14 and recycled for use in absorber 5, where it can be mixed with fresh or make-up treatment solution 3 containing active sulfur dye catalyst and potash. In order to prevent a build-up of thiosulfate in the process, a portion of stream 14 is removed via stream 15 for further processing, as will be described in more detail below, to recover the thiosulfate as a useful byproduct. Preferably, the regenerated catalyst should be removed by filtration first and recycled back to the absorber. Additional dewatering may also be required of the recovered thiosulfate solution or the thiosulfate solution byproduct can be treated to recover the thiosulfate ion through an ion exchange process.

Figure 3:
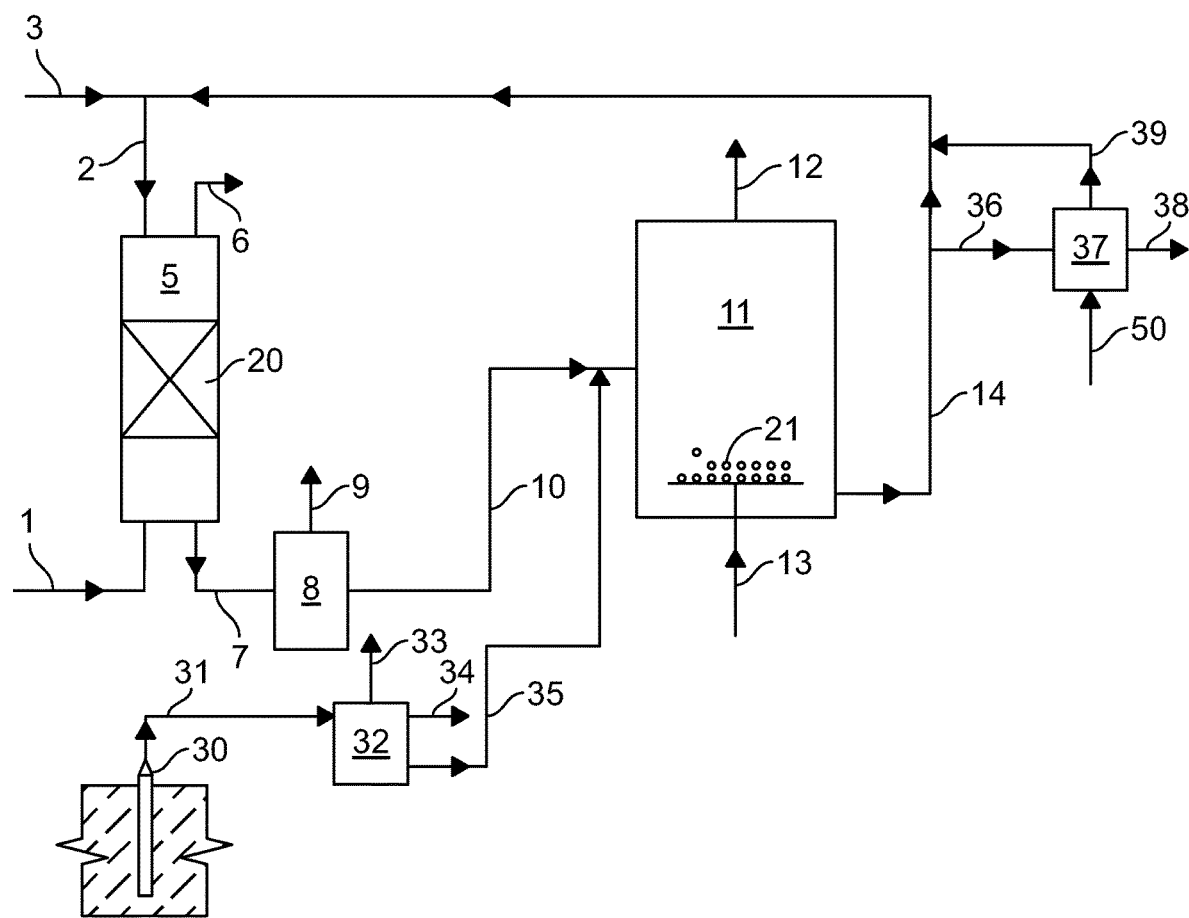
FIG. 3 schematically represents another variation of the process flow scheme depicted in FIG. 1.

As mentioned, the use of produced water recovered from on-site oil/gas wells can be beneficially used in the presently disclosed process to supply useful chemicals needed in the removal and conversion of the $H_2S$. FIG. 3 represents one possible flow scheme where produced water 31 is obtained from well 30 and supplied to a three-phase separator 32 where residual gas is removed via line 37, residual oil is removed via line 34 and an aqueous phase comprising water and dissolved salts is removed via line 35. The aqueous phase in line 35 can then be introduced into oxidizer 11 directly or, as shown in FIG. 3, mixed with the spent liquid treatment solution in line 10. In alternative embodiment, the residual oil in line 34 or the residual gas in line 37 or both can be introduced into line 1 as part of the feed. To compensate for the extra water being supplied to the oxidizer 11, it may be necessary to remove a portion of the regenerated liquid treatment solution as stream 36 where it is fed to a filtration unit operation 37 to recover and separate the regenerated catalyst for recycle back to the stream 14 through line 39. The filtration step 37 can employ a flush stream 50 containing sulfides that will solubilize and wash/dislodge the catalyst from the filter media. A source of sulfides for stream 50 can be a portion of stream 10. A water/thiosulfate solution is removed from the filtration unit operations 37 via line 38 and can be disposed of by injection into on-site oil/gas wells. This disposal method avoids transportation or further disposal costs normally associated with recovered produced water and also utilizes the dissolved salts as valuable reagents in the $H_2S$ removal process.

Figure 4:
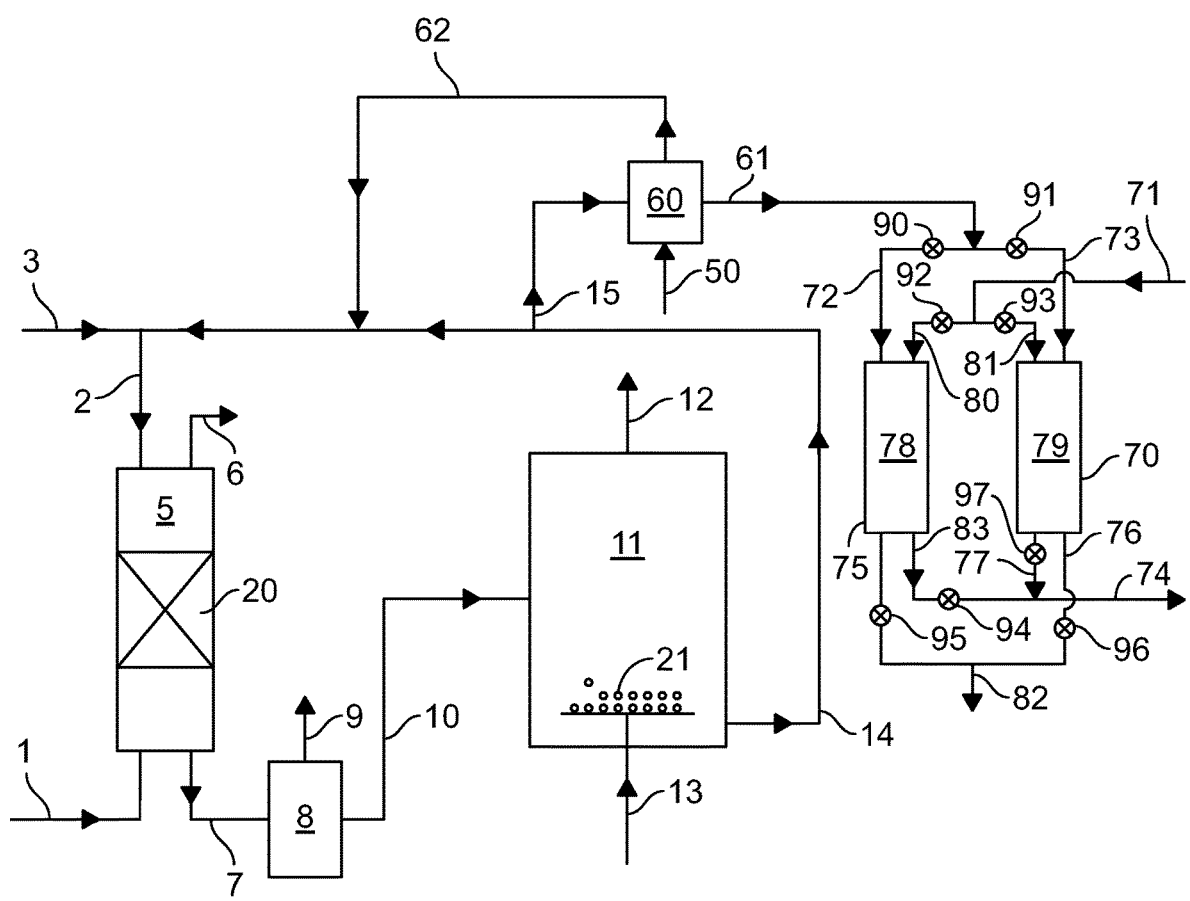
FIG. 4 schematically represents yet another variation of the process flow scheme depicted in FIG. 1.

In another possible variant of the present disclosure, the stream 15 is further treated using a combination of a filtration unit operation 60 and an ion exchange operation 70. This variant is schematically shown in FIG. 4 where the regenerated liquid treatment solution is introduced into a filtration process 60. A filter media is used to collect and separate the regenerated catalyst that is suspended in the liquid treatment solution as a slurry or semi-solid when it is removed from the oxidizer. The filtration process is run until the filter media becomes occluded or full. Although not shown in FIG. 4, the filtration process 60 would include process piping where a flushing liquid 50, preferably containing sulfides, could be used to backflush and clean the collected catalyst from the filter media. This backflush of recovered catalyst would be removed as stream 62 and could be fed back to the $H_2S$ removal process, for example, as shown in FIG. 4, by introduction into line 14. Preferably two or more filtration units could be operated in parallel (in a swing configuration) to maintain a continuous filtering operation. In other words, once a filter is occluded, the flow could be diverted from the occluded filter media to a clean filter so that back flushing of the occluded filter could be performed. The cycle would be repeated each time the filter media becomes full of the catalyst.

The liquid treatment solution separated from the regenerated catalyst is removed from the filtration step via line 61 and fed to an ion exchange process 70. The ion exchange system 70 preferably uses a plurality of one or more discrete ion exchange resin column beds 78,79 disposed in serial, cascading flow relation. To maintain a continuous operation, it may be necessary to have two or more of these serial beds arranged in parallel so that a swing-type operation could be employed similar to that described for the filtration process 60. Appropriate valves 90-97 and control systems that are within the existing skill of the art can be used to control the switchover from a column sequence operating in exchange mode to operation in regeneration mode. When properly performed, the ion exchange batch operation can be operated as a substantially continuous process. Higher levels of thiosulfate purity are attainable with increasing numbers of consecutive exchange beds. Resin regeneration solution is introduced through lines 71, 80 and 81 and removed through lines 74, 76 and 83. An ion exchanged liquid product comprising thiosulfate is removed via line 82.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

The invention claimed is:

1. A process to treat a hydrogen sulfide containing stream comprising:
   a) providing a feed stream comprising hydrogen sulfide to an absorber vessel containing a fixed bed of solid media;
   b) providing an aqueous liquid treatment solution comprising a sulfur dye catalyst to the absorber such that the aqueous liquid treatment solution mixes with the feed stream within the fixed bed of solid media;
   c) controlling the residence time of the aqueous liquid treatment solution and feed stream within the absorber such that the hydrogen sulfide is absorbed into the aqueous liquid treatment solution and converted into sulfide ions that are then absorbed onto the sulfur dye catalyst causing the sulfur dye catalyst to solubilize;
   d) removing a spent treatment solution from the absorber vessel, where the spent treatment solution contains the sulfide ions, water, spent sulfur dye catalyst, and dissolved gas;
   e) introducing the spent treatment solution into an oxidation vessel;
   f) introducing an oxygen containing gas into the oxidation vessel to contact the spent treatment solution causing the sulfide ions to oxidize to thiosulfate and to convert the spent sulfur dye catalyst to regenerated sulfur dye catalyst, where a portion of the regenerated sulfur dye catalyst is present as an insoluble slurry;
   g) removing from the oxidation vessel an aqueous liquid stream of regenerated liquid treatment solution comprising the thiosulfate, water, and the regenerated sulfur dye catalyst; and
   h) maintaining a predetermined thiosulfate concentration in the regenerated liquid treatment solution by removing a portion of the regenerated liquid treatment solution from the process.

2. The process of claim 1 further comprising directing the feed stream to flow upward from the bottom of the absorber and into the solid media.

3. The process of claim 1 further comprising directing the aqueous liquid treatment solution to flow downward into the solid media and counter current to an upward flow of the feed stream.

4. The process of claim 1 wherein a portion of the sulfur dye catalyst in the aqueous liquid treatment solution is present as an insoluble slurry.

5. The process of claim 1 further comprising removing excess oxygen containing gas from the oxidation vessel.

6. The process of claim 1 further comprising recycling the regenerated liquid treatment solution to the absorber for mixing with the aqueous liquid treatment solution prior to contacting with the feed stream.

7. The process of claim 1 where the portion of the regenerated liquid treatment solution is introduced into a separation process where the regenerated sulfur dye catalyst is separated from the thiosulfate by a filtration step and is recirculated to the absorber vessel, where the filtration step uses a filter media that collects the regenerated sulfur dye catalyst.

8. The process of claim 7 where the separation process further comprises contacting the regenerated liquid treatment solution with the filter media that comprises carbon or a membrane.

9. The process of claim 8 where the separation process includes a back flushing step that removes the regenerated sulfur dye catalyst from the filter media.

10. The process of claim 9 where the back flushing step comprises contacting the filter media with a liquid solution containing sulfide ions.

11. The process of claim 1 where the spent treatment solution is first introduced into a flash drum where a reduction in pressure causes the dissolved gas to separate from the spent treatment solution forming a flashed gas, where the spent treatment solution is then introduced into the oxidation vessel.

12. The process of claim 11 where the flashed gas removed from the flash drum is introduced into a second absorber vessel and contacted with a second liquid treatment solution to convert any residual hydrogen sulfide present.

13. The process of claim 12 where a stream of spent treatment solution is removed from the second absorber vessel and introduced into the oxidation vessel.

14. The process of claim 1 further comprising removing a product stream from the absorber vessel.

15. The process of claim 14 further comprising monitoring hydron sulfide levels in the product stream and controlling the oxygen containing gas introduced into the oxidation vessel.

16. A process to treat a hydrogen sulfide containing stream comprising:
    a) providing a feed stream comprising hydrogen sulfide to an absorber vessel containing a fixed bed of solid media;
    b) providing an amount of aqueous liquid treatment solution comprising a sulfur dye catalyst to the absorber such that the aqueous liquid treatment solution mixes with the feed stream within the fixed bed of solid media;
    c) controlling the residence time of the aqueous liquid treatment solution and feed stream within the absorber by adjusting a first control valve to change the amount of liquid treatment solution entering the absorber such that the hydrogen sulfide is absorbed into the aqueous liquid treatment solution and converted into sulfide ions that are then absorbed onto the sulfur dye catalyst causing the sulfur dye catalyst to solubilize;
    d) removing a spent treatment solution from the absorber vessel, where the spent treatment solution contains the sulfide ions, water, spent sulfur dye catalyst, and dissolved gas;
    e) introducing the spent treatment solution into an oxidation vessel; and
    f) controlling an amount of an oxygen containing gas introduced into the oxidation vessel that contacts the spent treatment solution by adjusting a second control valve that regulates the flow of the oxygen containing gas entering the oxidation vessel, where the second control valve is adjusted based on a measured oxidation reduction potential of fluids inside the oxidizer, inside the absorber or in an aqueous liquid stream of regenerated liquid treatment solution removed from the oxidizer, where the aqueous liquid stream of regenerated liquid treatment comprises thiosulfate, water, and regenerated sulfur dye catalyst causing the sulfide ions to oxidize to thiosulfate and to convert the spent sulfur dye catalyst to regenerated sulfur dye catalyst.

17. The process of claim 16 further comprising causing the sulfide ions in the oxidizer to oxidize to thiosulfate and to convert the spent sulfur dye catalyst to regenerated sulfur dye catalyst, where a portion of the regenerated sulfur dye catalyst is present as an insoluble slurry.

18. The process of claim 16 further comprising maintaining a predetermined thiosulfate concentration in the regenerated liquid treatment solution by removing a portion of the regenerated liquid treatment solution from the process.

19. The process of claim 16 further comprising measuring the oxidation reduction potential using a sensor located in the oxidizer or the absorber.

* * * * *